United States Patent Office 3,012,876
Patented Dec. 12, 1961

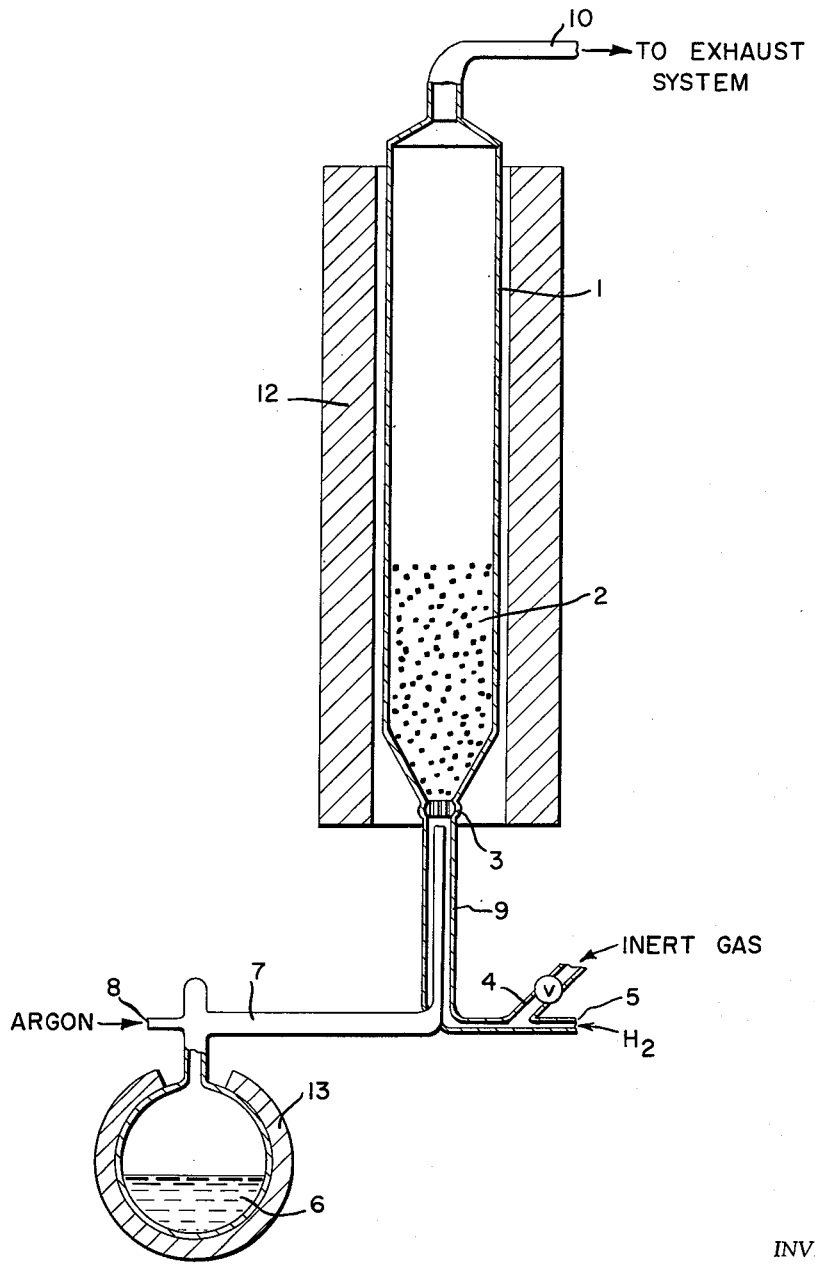

3,012,876
METAL PRODUCTION
Russell B. Eaton and Howard W. Jacobson, Wilmington, Del., assignors to E. I. du Pont de Nemours and Company, Wilmington, Del., a corporation of Delaware
Filed Oct. 7, 1960, Ser. No. 61,317
12 Claims. (Cl. 75—26)

This invention relates to the production of such metals as niobium, tantalum, molybdenum, and tungsten by the reduction of their halides with hydrogen. It also relates to the production of tungsten by hydrogen reduction of the oxyhalides of this metal. It also relates to the production of the hydrides of niobium and tantalum by hydrogen reduction of the halides of these metals.

The production of a refractory metal by the hydrogen reduction of the halide of the metal is well known. In this type of reduction, it is usually the practice to carry out the reduction in a reaction zone containing heated metal surfaces or ceramic surfaces upon which the metal product deposits as an adherent coating. In the present invention, it is an object to use the hydrogen reduction technique in such a manner that the refractory metal may be easily removed from the base upon which it is deposited. It is also an object to conduct the hydrogen reduction of a refractory metal halide in a fluidized bed operation. It is a further object of this invention to provide a fluidized bed operation which minimizes sticking between particles of the fluidized bed.

The objects of this invention are accomplished by a process for the production of a refractory metal selected from the group consisting of niobium, tantalum, molybdenum, and tungsten by reducing a chloride of these refractory metals with hydrogen in the presence of a fluidized salt bed and depositing the refractory metal product upon the particles of the salt bed. The process is begun by raising the temperature of a bed of salt particles in which the salt is selected from the group consisting of alkali metal chlorides (wherein the metal has an atomic number of at least 11), alkaline earth metal chlorides, and mixtures of these salts, to an operating temperature within the range of about 650° C.–950° C. by applying heat to the salt bed. In order to prevent the salt particles from sticking together as elevated temperatures are reached, a particular method of heating the bed to operating temperature is used in this invention. It has been found that when temperatures are reached at which sticking of the bed tends to occur (this is usually in the range of about 500° C.–650° C.), such sticking can be overcome by fluidizing the bed with a gaseous mixture of hydrogen and a refractory metal chloride having a critical ratio of hydrogen to metal chloride. When the refractory metal being produced is either niobium or tantalum, the quantity of hydrogen should be at least 40 times the stoichiometric amount for the reduction of the refractory metal halide to elemental metal. If molybdenum or tungsten is being produced, the quantity of hydrogen should be at least a stoichiometric quantity for the reduction of the halide to elemental metal. Under these conditions, a lower halide of the refractory metal deposits on the salt particles, thus forming a protective coating which prevents the particles from sticking together. As the temperature of the bed is increased to operating temperature, the lower halide is reduced to refractory metal, and it provides a surface upon which more metal will be deposited as fluidization of the bed is maintained at said operating temperatures. When a practical amount of metal product has been deposited upon the salt particles, these particles with the deposited metal may be recovered from the operation and the refractory metal product may be separated. Since the bed is composed of a water-soluble material, the subsequent separation of the salt and the metal can be easily accomplished by aqueous leaching. Other separation methods may be used which include vacuum distillation, vacuum arc melting, or a combination of these processes.

The refractory metal chlorides for use in this invention are any of the chlorides or oxychlorides of niobium, tantalum, molybdenum, or tungsten which are capable of being reduced to elemental metal by hydrogen. Included in this group are niobium pentachloride, tantalum pentachloride, molybdenum pentachloride, tungsten hexachloride, tungsten dioxydichloride, or tungsten oxytetrachloride. In cases where the refractory metal forms more than one chloride which is reducible to elemental metal by hydrogen, a mixture of such chlorides can be used. For example, if tungsten is to be produced, the invention contemplates the use of a mixture of two or more of the tungsten chlorides described above. These latter compounds are readily produced as a mixture by chlorination of the oxidic ores of tungsten, and they may be fed directly from a chlorination unit to a reactor suitable for carrying out the process of this invention. Niobium oxychloride cannot be used since it is known to produce the oxide of niobium.

The temperature range for deposition in good yields has been found to be not below 650° C. and may range, with proper choice of bed material, to as high as about 950° C. If the reduction reaction takes place in good yield at temperatures of about 650° C. to about 795° C., NaCl has been found to be a preferred bed material. If a preferred reaction temperature is from about 775° C. to about 950° C. BaCl$_2$ has been found to be the preferred bed material. Other alkali metal chlorides and alkaline earth metal chlorides which may be used include potassium chloride, magnesium chloride, and calcium chloride.

The drawing is a schematic diagram of an apparatus which is suitable for carrying out the process of this invention.

To the further understanding of the operation of this invention, reference is made to the drawing. Reactor tube 1 is fabricated of a material which is resistant to the chemical action of the reactants at the temperatures used in this invention. Such materials as silica, niobium-coated or tantalum-coated metal, 316 stainless steel, or "Inconel" are suitable. Into this reactor tube is charged an alkali metal or alkaline earth metal chloride which makes up the starting bed 2. Prior to operation, the bed is supported on a porous filter 3. During the start-up of the operation, the bed is fluidized by the upward flow of hydrogen introduced through inlet 5 and passed to the reactor through conduit 9. If desired, the fluidizing gas may be a mixture of hydrogen and an inert gas which is introduced into the hydrogen line through conduit 4. The reaction chamber (i.e., the zone within tube 1) is heated by a furnace 12, or a portion of the heat required for the reaction may be obtained by preheating the hydrogen or the mixture of hydrogen and inert gas. When the bed 2 has been heated to approximately 500° C., the feed of metal halide or oxyhalide into tube 7 is begun by heating and volatilizing the metal halide or oxyhalide 6 in vaporizer 13. The volatilized metal halide is carried through conduit 7 and into the reactor by a flow of inert gas introduced through inlet 8. Experience has shown that at the point in the operation when the temperature of the salt bed is being raised from about 500° C. to optimum temperatures for metal deposition, the salt particles of the bed soften and tend to stick together, and this quite obviously prevents effective fluidization. As previously pointed out, it has been found that this sticking of the bed can be overcome if a critical ratio of hydrogen to refractory metal halide is used to fluidize the bed. These critical ratios have been set forth earlier in the specification and preferred ratios are set forth in Table I below. These ratios of $H_2$ to metal halide cause a lower halide of the refractory metal to deposit on the salt particles as the temperature is being raised, and this deposit prevents the salt particles from sticking to each other. As the temperature of the bed is increased to operating temperature, the lower halide is reduced to refractory metal and it provides a surface upon which to deposit more metal as fluidization of the bed is continued with the mixture of hydrogen and refractory metal halide in which the ratio of hydrogen to halide is within the ranges previously given to prevent bed sticking. However, it will be disclosed later in this specification that once the bed-sticking has been overcome, one may operate efficiently outside these ranges when the metal being produced is niobium or tantalum. By-products of the reduction reaction, inert gas carriers, and unreacted materials are removed in the vapor state through conduit 10.

TABLE I

| Starting Refractory Metal Halide | Mol Ratio, $H_2$:Metal Chloride |
| --- | --- |
| $NbCl_5$ | 125:1–200:1 (50–80 times stoichiometric according to Equation I). |
| $TaCl_5$ | 150:1–200:1 (60–80 times stoichiometric according to Equation II). |
| $MoCl_5$ | 2.5:1–30:1 (1–12 times stoichiometric according to Equation III). |
| $WCl_6$ | 3:1–30:1 (1–10 times stoichiometric according to Equation IV). |
| $WO_2Cl_2$ | 3:1–30:1 (1–10 times stoichiometric according to Equation V). |
| $WOCl_4$ | 3:1–30:1 (1–10 times stoichiometric according to Equation VI). |

EQUATION I $$2NbCl_5 + 5H_2 \rightarrow 10HCl + 2Nb$$

EQUATION II $$2TaCl_5 + 5H_2 \rightarrow 10HCl + 2Ta$$

EQUATION III $$2MoCl_5 + 5H_2 \rightarrow 10HCl + 2Mo$$

EQUATION IV $$WCl_6 + 3H_2 \rightarrow 6HCl + W$$

EQUATION V $$WO_2Cl_2 + 3H_2 \rightarrow W + 2H_2O + 2HCl$$

EQUATION VI $$WOCl_4 + 3H_2 \rightarrow W + 4HCl + H_2O$$

As previously mentioned, the methods of removing the deposited metal from the water-soluble base include aqueous leaching, vacuum distillation, vacuum arc melting, or a combination of these processes.

If the deposition of niobium or tantalum on the salt bed particles is carried to such a degree that there is a large amount of metal as compared to salt (e.g., the invention has been operated to deposit as much as 97% by weight of metal on 3% by weight of salt), it may be preferable to convert the niobium or tantalum to its hydride in order to facilitate the removal of the salt base from the metal. The hydrides of these metals can be easily crushed, and the salt can be removed from the crushed material by leaching. The hydride, thus freed of salt, may then be reconverted to metal simply by heating to temperatures above about 800° C. under conditions which carry away the released hydrogen. The formation of niobium hydride or tantalum hydride can be accomplished in this invention by cooling the bed in the presence of hydrogen to a temperature which is below the decomposition temperature of the metal hydride. Temperatures below about 300° C. are sufficient for this purpose. This procedure converts the niobium or tantalum to its hydride.

The following examples will illustrate more fully the operation of my invention. These examples are intended to be merely illustrative of the invention and not in limitation thereof.

*Example I*

The $BaCl_2$ used for fluidized bed material was prepared by dehydrating $BaCl_2.2H_2O$ by heating at 140° C. for 8 hours, and then fluidizing the dehydrated material with anhydrous hydrogen chloride in a 25 mm. internal diameter tube at 500° C. for 2 hours to eliminate all oxide from the salt surface.

Fifty grams of $BaCl_2$, which had been thus pre-treated, 7% of which was −20 +40 mesh particle size, 80% of −40 +80 mesh, and 13% of −80 +120 mesh, was placed in a 22 mm. internal diameter silica tube surrounded by appropriate furnace installations, and was fluidized to about double the bed volume by the upward flow of hydrogen. The bed fluidized efficiently until a temperature of 550° C. was reached, and at this point, the bed material became sticky. At this temperature, introduction of $NbCl_5$ was started.

Operating at a $H_2/NbCl_5$ mol ratio of approximately 135:1, until 1 gram of $NbCl_5$ was being introduced for every 10 grams of $BaCl_2$ bed material over the temperature range 550° C. to 650° C., the $NbCl_5$ was reduced to a black lower chloride that adhered to the $BaCl_2$ surface, eliminating bed stickiness and allowing one to continue to raise the temperature of the fluidized bed. The temperature of the reactor was then raised to 840° C. and the hydrogen reduction of $NbCl_5$ to niobium metal proceeded on the surface of the fluidized lower-chloride coated $BaCl_2$ particles.

The reaction was allowed to proceed until, after 4¾ hours, 43.2 grams of niobium pentachloride had been volatilized from the reservoir at 258° C. and carried into the reactor by a flow of 10 ml./min. of argon. The bed was cooled in argon and the bed weight was found to be 63.9 grams, an increase of 13.9 grams over the original bed weight. This is a 93.5% yield on the niobium volatilized from the charge of niobium pentachloride. The mol ratio of hydrogen to niobium pentachloride in this reaction was 135:1. The flow of hydrogen over the 4¾ hr. reaction time was 1.71 liters per min.

The bed particles ($BaCl_2.Nb$) were crushed and leached with distilled water until no chloride could be detected in the filtrate ($AgNO_3$ test). Niobium metal weighing 13.9 g. was recovered.

*Example II*

The $BaCl_2$ used for fluidized bed material was prepared by dehydrating $BaCl_2.2H_2O$ by heating at 140° C. for 8 hours, and then fluidizing with anhydrous hydrogen chloride in a 45 mm. internal diameter tube at 500° C. for 2 hours to eliminate all oxide from the salt surface.

244 grams of $BaCl_2$ thus pre-treated, 60% of −40 +60 mesh particle size, and 40% of −60 +80 mesh, was placed in a 42 mm. internal diameter silica tube surrounded by appropriate furnace installations, and was fluidized to about double the bed volume by the upward flow of hydrogen. The bed fluidized efficiently until a temperature of 550° C. was reached, and at this point the bed material became sticky. At this temperature introduction of $NbCl_5$ was begun. Operating at $H_2/NbCl_5$ mol ratio of approximately 120:1, 1 gram of $NbCl_5$ was introduced for every 10 grams of $BaCl_2$ bed material over the temperature range 550° C. to 650° C. Under these conditions, the bed again was fluidized efficiently. Over the temperature range 550° to 650° C., the $NbCl_5$ is reduced to a black lower chloride that adheres to the $BaCl_2$ surface, eliminating bed stickiness and allowing one to continue to raise the temperature of the bed in the fluidized state. The temperature of the reactor was then raised to 840° C. and the hydrogen reduction of NbCl$_5$ to niobium metal proceeded on the surface of the fluidized BaCl$_2$ particles.

The reaction was allowed to proceed until, after 2¼ hours, 61 grams of niobium pentachloride present in the reservoir (which was held at a temperature of 258° C.) had been carried into the reactor by the flow of 20 ml./min. of argon. The bed was cooled in argon and the bed weight was found to be 262 grams, an increase of 18.0 grams over the original bed weight. This is an 86% yield on the niobium volatilized from the charge of niobium pentachloride. The mol ratio of hydrogen to niobium pentachloride throughout the reaction time was 120:1. The flow of hydrogen over the 2¼ hr. reaction time was 4.5 liters per min.

The bed particles which were composed of BaCl$_2$ and Nb were crushed and leached with distilled water until no chloride could be detected in the filtrate (AgNO$_3$ test). Niobium metal was recovered weighing 18.0 grams.

*Example III*

The NaCl used for fluidized bed material in this example was prepared by drying the salt for 4 hours at 140° C. and then fluidizing it with anhydrous hydrogen chloride in a 25 mm. internal diameter tube at 500° C. for two hours to eliminate all oxide from the salt surface. Forty grams of this NaCl, 28% of −20 +40 mesh particle size, and 72% −40 +80 mesh, was placed in a 22 mm. internal diameter silica tube surrounded by appropriate furnace installations, and was fluidized to about double the bed volume by the upward flow of hydrogen. The bed fluidized efficiently until a bed temperature of 525° C. was reached, and at this point the bed material became sticky. NbCl$_5$ was introduced with hydrogen at a H$_2$/NbCl$_5$ mol ratio of approximately 140:1, until one gram of NbCl$_5$ was being introduced for every 10 grams of NaCl, over the temperature range 525° C. to 650° C. Under these conditions the bed again fluidized efficiently and heating to higher temperatures was continued. During this time, the NbCl$_5$ was reduced to a black lower chloride that adhered to the NaCl surface eliminating bed stickiness, thus allowing one to continue to raise the temperature of the fluidized bed. The temperature was raised to 775° C. while continuing the flow of gases, and the hydrogen reduction of NbCl$_5$ to niobium metal proceeded on the surface of the fluidized NaCl particles.

The reaction was allowed to proceed until, after 4¼ hours, 37.5 grams NbCl$_5$ in the reservoir had been volatilized from the reservoir at 258° C. and carried into the reactor by the flow of 8 ml./min. of argon. The bed was cooled in argon and the bed weight was found to be 49.1 grams, an increase of 9.1 grams over the original bed weight. This is a 70% yield on the niobium volatilized from the charge of niobium pentachloride. The flow of hydrogen over 4¼ hours reaction time was 1.8 liters per min.

The bed particles which were composed of NaCl and Nb were crushed and leached with distilled water until no chloride could be detected in the filtrate (AgNO$_3$ test). Niobium metal weighing 9.1 grams was recovered.

*Example IV*

The NaCl used for fluidized bed material was prepared by drying the salt for 4 hours at 140° C., and then fluidizing it with anhydrous hydrogen chloride in a 25 mm. internal diameter tube at 500° C. for two hours to eliminate all oxide from the salt surface.

Forty grams of NaCl, thus pre-treated, 25% of which was −20 +40 mesh, particle size, and 75% of which was −40 +80 mesh, was placed in a 22 mm. internal diameter silica tube surrounded by appropriate furnace installations, and was fluidized to about double the bed volume by the upward flow of hydrogen. The bed fluidized efficiently until a bed temperature of 525° C. was reached, and at this point the bed material became sticky. By introduction of NbCl$_5$ along with hydrogen at a H$_2$/NbCl$_5$ mol ratio of approximately 140:1 until 1 gram of NbCl$_5$ was being introduced for every 10 grams of NaCl over the temperature range 500° C. to 650° C., the bed was again fluidized efficiently. The temperature of the reactor was then raised to 775° C. and the hydrogen reduction of NbCl$_5$ to niobium metal proceeded on the surface of the fluidized NaCl particles.

The reaction was allowed to proceed until, after 5 hours, 41.0 gms. of the NbCl$_5$ in the reservoir at 258° C. had been volatilized and carried into the reactor by a flow of 8 ml./min. argon. The bed was cooled in argon and the bed weight was found to be 50.9 grams, an increase of 10.9 grams over the original bed weight. This is a 77% yield on the niobium volatilized from the charge of niobium pentachloride. The mol ratio of hydrogen to niobium pentachloride calculated for the entire reaction time was 159:1. The flow of hydrogen calculated for the 5 hour reaction time was 1.8 liters per min.

The bed particles which were composed of NaCl and Nb were placed in a niobium crucible which was mounted in a vacuum distillation apparatus. The NaCl was removed by vacuum distillation at 1200° C., using a 10$^{-5}$ mm. vacuum. Niobium metal weighing 10.9 grams was recovered.

*Example V*

The BaCl$_2$ used for fluidized bed material was prepared by dehydrating BaCl$_2$·2H$_2$O by heating the salt at 140° C. for 8 hours, and then fluidizing it with anhydrous hydrogen chloride in a 25 mm. internal diameter tube at 500° C. for 2 hours to eliminate all oxide from the salt surface.

Fifty grams of BaCl$_2$, 10% of which was −20 +40 mesh of particle size, 75% −40 +80 mesh and 15% −80 +120 mesh, was placed in a 22 mm. internal diameter silica tube surrounded by appropriate furnace installations and was fluidized to about double the bed volume by the upward flow of hydrogen. The bed fluidized efficiently until a temperature of 550° C. was reached, and at this point the bed material became sticky. By introduction of NbCl$_5$ along with the hydrogen at a H$_2$/NbCl$_5$ mol ratio of approximately 135:1 until 1 gram of NbCl$_5$ was being introduced for every 10 grams of BaCl$_2$ bed material over the temperature range 550° C. to 650° C., the bed again was fluidized efficiently. The temperature of the reactor was then raised to 840° C., and the hydrogen reduction of NbCl$_5$ to niobium metal proceeded and the metal product was deposited on the surface of the fluidized BaCl$_2$ particles.

The reaction was allowed to proceed until, after 5 hours, 46.5 grams of niobium pentachloride in the reservoir, held at .258° C. had been volatilized and carried into the reactor. The bed was cooled in argon and the bed weight was found to be 64.1 grams, an increase of 14.1 grams over the original bed weight. This is an 88% yield on the niobium volatilized from the charge of niobium pentachloride. The mol ratio of hydrogen to niobium pentachloride in this reaction was 133:1. The flow of hydrogen over the 5 hour reaction time was 1.71 liters per min.

The bed particles which were composed of BaCl$_2$ and Nb were placed in a niobium crucible which was mounted in a vacuum distillation apparatus. The BaCl$_2$ was removed by vacuum distillation at 1350° C. using a 10$^{-5}$ mm. vacuum. Niobium metal weighing 16.0 grams was recovered.

*Example VI*

An experiment was carried out as described in Example IV, above, except that, after 5 hours of operation, when all of the NbCl$_5$ had been volatilized from the reservoir into the reactor, the flow of hydrogen was continued, and the bed was cooled in an atmosphere of hydrogen to a temperature of 50° C. in a period of 1½ hours.

The cooled bed was then dumped and its weight was found to be 64.2 g. X-ray analysis showed that the coating on the salt was hydride, NbH. The particles were friable and were crushed by means of light pressure in a stainless steel mortar. The crushed material was water leached until the wash water was chloride-free, and the niobium hydride was dried at 150° C. A particle size separation was made by screening, and the —80 to +200 mesh portion of the material was put back into the reactor as a part of the bed material for further deposition of niobium.

*Example VII*

The NaCl used for fluidized bed material in this example was prepared by drying the salt for 4 hours at 140° C. and then fluidizing it with anhydrous hydrogen chloride in a 25 mm. internal diameter tube at 500° C. for 2 hours to eliminate all oxide from the salt surface.

Forty grams of NaCl, 28% of which was —20 +40 mesh particle size, and 72% —40 +80 mesh, was placed in a 22 mm. internal diameter silica tube surrounded by appropriate furnace installations, and was fluidized to about double the bed volume by the upward flow of hydrogen at a rate of 1.5 liters per min. The bed fluidized efficiently until a bed temperature of 535° C. was reached. At this point the bed became sticky. Feed of $TaCl_5$ was started into the reactor at a mol ratio of $H_2$ to $TaCl_5$ of 140:1 until 1 gram of $TaCl_5$ was being introduced for every 10 g. of NaCl over the temperature range of 525° C. to 625° C. Under these conditions, the bed again became efficiently fluidized by the deposition of a lower chloride of tantalum, and the temperature was raised to 775° C. The hydrogen reduction of $TaCl_5$ to tantalum metal continued, the metal being deposited on the surface of the salt.

The reaction was continued until 45 grams of $TaCl_5$ had been volatilized to the reactor from a reservoir held at 239° C. At the conclusion of the run, the bed was cooled in a flow of argon and then weighed. The weight of the bed was 58.5 g., an increase of 18.5 grams over the weight of the original bed. This represents an 80% yield of metal in the halide fed to the reactor. The metal-coated salt bed material was vacuum distilled at 1250° C. for 2 hours to remove the NaCl.

*Example VIII*

A fluidized bed of 40 g. of NaCl was prepared in a 22 mm. silica reactor as described in Example VII. Heating of the reactor tube was begun and hydrogen was introduced into the reactor at a rate of 1.0 liter per min. When the temperature reached 525° C. stickiness of the bed was encountered, and at this temperature introduction of $WCl_6$ vapor at a rate of 1.76 g./min. (mol ratio of 10 to 1 for hydrogen to $WCl_6$) was begun from an outside boiler heated to about 350° C. As a dark, lower chloride coated the salt particles, the bed again became fluid. The temperature of the reaction vessel was increased to 725° C. and the hydrogen to $WCl_6$ mol ratio was maintained at 10 to 1 throughout the reaction time of 1.0 hour. Metal was deposited on salt particles until a total of 106 g. of $WCl_6$ had been vaporized into the reactor. The reactor was cooled to room temperature while still under flow of hydrogen, and the bed, when discharged, was found to weigh 87.0 g. This represents a 96% yield of the tungsten values fed to the reactor.

The metal-coated salt particles were vacuum distilled for 2 hours at 1250° C. to produce tungsten of high purity.

*Example IX*

In a silica reactor tube 22 mm. in diameter, a 40 g. NaCl bed was prepared and heated under a flow of 1.0 liter per min. of hydrogen as described in Example VII. When the temperature of the reactor had reached 520° C., stickiness of the bed was encountered, and a feed of $MoCl_5$ at a mol ratio of $H_2$ to $MoCl_5$ of 20 to 1 was begun from an outside vaporizer heated to 270° C. Under these conditions, the bed again fluidized efficiently, and this $H_2/MoCl_5$ ratio was maintained throughout the reaction. 66 grams of $MoCl_5$ were fed to the reactor over a period of 1.8 hours. Heating was stopped, and the reactor tube was cooled to room temperature under a flow of hydrogen. When the molybdenum-coated salt bed was removed from the reactor it was found to weigh 59 g. (19 grams increase in bed weight), representing an 82% yield of metal based on the $MoCl_5$ fed to the reactor.

The metal-coated salt particles were water-leached and vacuum-distilled for 2 hours, at 1250° C. to produce 14 g. of molybdenum of high purity.

*Example X*

The $BaCl_2$ used for the fluidized bed material was prepared by dehydrating $BaCl_2 \cdot 2H_2O$ at 140° C. for 8 hours and then fluidizing it in a 22 mm. internal diameter tube with anhydrous hydrogen chloride at 500° C. for 2 hours to eliminate all oxide from the salt surface.

(a) Thirty-two grams of this $BaCl_2$ (—140 +200 mesh) were placed in a silica tube, surrounded by appropriate furnace installations and fluidized by the upward flow of hydrogen to about double the bed volume. The bed fluidized efficiently until a temperature of 550° C. was reached, and at this point the bed material became sticky. $NbCl_5$ was introduced along with the hydrogen at a $H_2/NbCl_5$ mol ratio of approximately 135:1 until 1 gram of $NbCl_5$ was being introduced for every 10 grams of $BaCl_2$ bed material. Under these conditions the bed again fluidized efficiently over the temperature range 550° C. to 650° C. This was due to the fact that the $NbCl_5$ reduced to a black lower chloride which adhered to the $BaCl_2$ surface, thus eliminating bed stickiness and allowing one to maintain fluidization of the bed as the temperature is raised. The temperature of the reactor was raised to 775° C. and hydrogen reduction of $NbCl_5$ to niobium metal proceeded on the surface of the fluidized $BaCl_2$ particles. $NbCl_5$ and $H_2$ were passed into the bed until the bed weight was 130 grams. The reaction was stopped at this point to transfer the bed to a larger unit. A yield of 84% of Nb based on the $NbCl_5$ fed was realized. The $H_2/NbCl_5$ mol ratio was 135:1. An average deposition rate of 4 grams Nb per hour was maintained.

(b) The 130-gram bed from (a) charged into a 42 mm. internal diameter silica reactor tube. Deposition of Nb by the reduction of $NbCl_5$ with $H_2$ was continued until the bed weight was 385 grams. An average $H_2/NbCl_5$ mol ratio of 120:1 was used and the reaction temperature was 825° C. An average deposition rate of 12 g. Nb per hour was maintained. The bed material at the conclusion of the run was 8.3% $BaCl_2$ and 91.7% Nb.

(c) The 385-gram bed from (b) was charged into a 3-inch diameter silica reactor tube. Deposition of Nb by the reduction of $NbCl_5$ with $H_2$ was then continued until the bed weight was 1120 grams. An average $H_2/NbCl_5$ mol ratio of 125:1 was used, and the reaction temperature was 825° C. An average deposition rate of 21 g. Nb per hour was maintained. The bed material at the conclusion of the run was 2.8% $BaCl_2$ and 97.2% Nb. The particle size of the bed was in the range of —60 to +80 mesh.

(d) The 1120-gram bed from (c) was hydrostatically pressed without leaching or further processing of any kind at 50,000 lbs./sq. in. into a one-inch round rod suitable for consumable arc melting. The arc melting furnace consisted of a water-cooled copper crucible with a moving water-cooled electrode mold. The arc was struck between the hydrostatically pressed one-inch round rod and the bottom of the copper crucible. The electrode melted off progressively into the copper crucible. The niobium ingot recovered from the copper crucible had a chloride content of 0.05%. The metal was very ductile and had a Brinell hardness of 95.

Example XI

By chlorination of an oxidic ore of tungsten using phosgene as a chlorinating agent and a temperature of 330° C. to 475° C., 40 grams of mixed oxychlorides of tungsten, 98% by weight $WO_2Cl_2$ and 2% $WOCl_4$, were obtained. The material was a light yellow crystalline material which was found to sublime at 265° C.

A fluidized salt bed of 40 g. of NaCl was prepared as described in Example III and the bed was fluidized by the upward flow of hydrogen to about double its volume. The bed was heated by external furnacing means and bed stickiness was encountered at 525° C. At this temperature, the mixed oxychlorides of tungsten were introduced into the reactor, and the feed rate was adjusted until the hydrogen-oxychloride mol ratio was approximately 20:1 and 1 gram of oxychloride was being introduced for every 10 grams of NaCl over a temperature range of 550° C. to 750° C. The hydrogen flow rate was 0.3 liter per minute. When the temperature of the bed reached 550° C., the salt particles became coated with a dark lower-chloride of tungsten and the stickiness of the bed disappeared. The temperature was held at 750° C. until the 40 grams of mixed oxychlorides had been vaporized into the reactor. The total time for the reaction was 2¼ hours.

After all of the oxychloride had been fed to the reactor, the bed was cooled under flow of hydrogen and discharged from the reactor. The bed weight was found to be 58.4 g. The particles were water leached and vacuum distilled to produce 18.4 g. of pure tungsten metal.

In the operation of this invention, variation may be made in the method of introducing the reactants to the reaction chamber, and it is not intended that the drawing, or the description thereof, be interpreted as a limitation of the invention. If the reactants are heated separately outside the reactor, they may be brought into the reactor through concentric inlet pipes, as shown in the drawing, or through separate nozzles. As another alternative, one may introduce the metal halide or oxyhalide into the bed at a point above the porous bed support. Each of these arrangements prevents early mixing of the reactants and premature deposition of metal outside the reaction zone. The particular arrangement used is not at all critical so long as it prevents substantial commingling of the hot reactants prior to their entry into the reaction zone.

In the case where niobium or tantalum is being produced, it has been found that once the protective coating of metal has been laid down on the individual salt particles, it is possible to operate at lower ratios of hydrogen to metal halide than the start-up ratios necessary to prevent sticking of the salt bed. If the metal under production is niobium the process may be carried out within the operating temperature range specified, with the mol ratio being 50–225 mols of hydrogen per mol of niobium chloride. In tantalum production, it has been found that from 80–225 mols of hydrogen per mol of tantalum chloride should be used.

Since it is obvious that many changes and modifications can be made in the above-described details without departing from the nature and spirit of the invention, it is to be understood that the invention is not to be limited to said details except as set forth in the appended claims.

This application is a continuation-in-part of our application Serial No. 779,190, filed December 9, 1958, now abandoned.

The embodiments of the invention in which an exclusive property or privilege is claimed are defined as follows:

1. A process for the production of niobium comprising heating a bed of salt particles in which the salt is selected from the group consisting of alkali metal chlorides wherein the metal has an atomic number of at least 11, alkaline earth metal chlorides, and mixtures of these salts, and when the temperature of said bed is in the range of 500° C.–650° C., at which temperature the bed particles soften and stick together, overcoming the sticking of the bed by fluidizing it with a gaseous mixture of hydrogen and niobium pentachloride in which the amount of hydrogen to niobium pentachloride is at least 40 times stoichiometric based upon the reduction of the niobium pentachloride to elemental niobium, maintaining the fluidization of the bed and continuing said heating until temperatures of 650° C.–950° C. and not above the melting point of the salt bed particles are reached, thus reducing the niobium pentachloride to elemental niobium and depositing said niobium upon the particles of the fluidized salt bed, recovering the salt particles of the bed with the niobium deposited thereon, and then separating the salt from the deposited niobium.

2. The process of claim 1 in which the salt bed consists of sodium chloride.

3. The process of claim 1 in which the salt bed consists of barium chloride.

4. A process for the production of niobium comprising heating a bed of salt particles in which the salt is selected from the group consisting of alkali metal chlorides wherein the metal has an atomic number of at least 11, alkaline earth metal chlorides, and mixtures of these salts, and when the temperature of said bed is in the range of 500° C.–650° C., at which temperature the bed particles soften and stick together, overcoming the sticking of the bed by fluidizing it with a gaseous mixture of hydrogen and niobium pentachloride in which the amount of hydrogen to niobium pentachloride is at least 40 times stoichiometric based upon the reduction of the niobium pentachloride to elemental niobium, maintaining the fluidization of the bed and continuing said heating until temperatures of 650° C.–950° C. and not above the melting point of the salt bed particles are reached, thus reducing the niobium pentachloride to elemental niobium and depositing said niobium upon the particles of the fluidized salt bed, stopping the flow of niobium pentachloride, cooling the bed in the presence of hydrogen until niobium hydride is formed, crushing the particles of the salt bed containing niobium hydride, aqueous leaching said particles to remove the salt, and then reconverting the hydride to the metal by heating the hydride to temperatures above its decomposition temperature.

5. A process for the production of tantalum comprising heating a bed of salt particles in which the salt is selected from the group consisting of alkali metal chlorides wherein the metal has an atomic number of at least 11, alkaline earth metal chlorides, and mixtures of these salts, and when the temperature of said bed is in the range of 500° C.–650° C., at which temperature the bed particles soften and stick together, overcoming the sticking of the bed by fluidizing it with a gaseous mixture of hydrogen and tantalum pentachloride in which the amount of hydrogen to tantalum pentachloride is at least 40 times stoichiometric based upon the reduction of the tantalum pentachloride to elemental tantalum, maintaining the fluidization of the bed and continuing said heating until temperatures of 650° C.–950° C. and not above the melting point of the salt bed particles are reached, thus reducing the tantalum pentachloride to elemental tantalum and depositing said tantalum upon the particles of the fluidized salt bed, stopping the flow of tantalum pentachloride, cooling the bed in the presence of hydrogen until tantalum hydride is formed, crushing the particles of the salt bed containing tantalum hydride, aqueous leaching said particles to remove the salt, and then reconverting the hydride to the metal by heating the hydride to temperatures above its decomposition temperature.

6. A process for the production of a refractory metal selected from the group consisting of niobium, tantalum, molybdenum, and tungsten, comprising heating a bed of salt particles in which the salt is selected from the group consisting of alkali metal chlorides wherein the metal has an atomic number of at least 11, alkaline earth metal chlorides, and mixtures of these salts, and when the temperature of said bed reaches that at which the particles of salt soften and stick together, overcoming the sticking of the bed by fluidizing it with a gaseous mixture of hydrogen and a refractory metal chloride in which the quantity of hydrogen is based upon the stoichiometric amount required for the reduction of the refractory metal chlorides to elemental metal, said quantity being at least 40 times the stoichiometric amount when the refractory metal is selected from the group consisting of niobium and tantalum and at least a stoichiometric amount when the refractory metal is selected from the group consisting of molybdenum and tungsten, maintaining the fluidization of the bed and continuing said heating until operating temperatures of 650° C.–950° C. and not above the melting point of the salt bed particles are reached, thus reducing the refractory metal chloride to refractory metal and depositing said metal upon the particles of the fluidized salt bed, recovering the salt particles of the bed with the refractory metal deposited thereon, and then separating the salt from the deposited refractory metal.

7. The process of claim 6 in which the salt bed consists of sodium chloride.

8. The process of claim 6 in which the salt bed consists of barium chloride.

9. The process of claim 6 in which the refractory metal is tantalum.

10. A process for the production of a refractory metal selected from the group consisting of niobium, tantalum, molybdenum, and tungsten, comprising heating a bed of salt particles in which the salt is selected from the group consisting of alkali metal chlorides wherein the metal has an atomic number of at least 11, alkaline earth metal chlorides, and mixtures of these salts, and when the temperature of said bed is in the range of 500° C.–650° C., at which temperature the bed particles soften and stick together, overcoming the sticking of the bed by fluidizing it with a gaseous mixture of hydrogen and a refractory metal chloride selected from the group consisting of niobium pentachloride, tantalum pentachloride, molybdenum pentachloride, tungsten hexachloride, tungsten dioxydichloride, tungsten oxytetrachloride, and mixtures of said tungsten chlorides, the quantity of hydrogen in said mixture being based upon the stoichiometric amount required for the reduction of the refractory metal chlorides to elemental metal, said quantity being at least 40 times the stoichiometric amount when the refractory metal is selected from the group consisting of niobium and tantalum and at least a stoichiometric amount when the refractory metal is selected from the group consisting of molybdenum and tungsten, maintaining the fluidization of the bed and continuing said heating until temperatures of 650° C.–950° C. and not above the melting point of the salt bed particles are reached, thus reducing the refractory metal chloride to refractory metal and depositing said metal upon the particles of the fluidized salt bed, recovering the salt particles of the bed with the deposited metal, and then separating the salt from the deposited refractory metal.

11. The process of claim 10 in which the salt bed consists of sodium chloride.

12. The process of claim 10 in which the salt bed consists of barium chloride.

References Cited in the file of this patent

UNITED STATES PATENTS

| | | |
|---|---|---|
| 2,604,395 | Gonser et al. | July 22, 1952 |
| 2,758,021 | Drapeau et al. | Aug. 7, 1956 |
| 2,766,112 | Schafer | Oct. 9, 1956 |
| 2,827,371 | Quin | Mar. 18, 1958 |

OTHER REFERENCES

Campbell et al.: Trans. of the Electrochemical Society, vol. 96, No. 5, 1949, pages 318–333.